(12) United States Patent
Bhatnagar et al.

(10) Patent No.: US 10,329,907 B2
(45) Date of Patent: Jun. 25, 2019

(54) OPTIMIZING MATRIX ACIDIZING TREATMENT

(71) Applicant: Halliburton Energy Services, Inc., Houston, TX (US)

(72) Inventors: Ankit Bhatnagar, Pune (IN); Mohammed Monsur Alam, Doha (BD)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/781,888

(22) PCT Filed: Dec. 17, 2014

(86) PCT No.: PCT/US2014/070709
§ 371 (c)(1),
(2) Date: Oct. 1, 2015

(87) PCT Pub. No.: WO2016/099470
PCT Pub. Date: Jun. 23, 2016

(65) Prior Publication Data
US 2017/0275990 A1 Sep. 28, 2017

(51) Int. Cl.
*E21B 49/00* (2006.01)
*E21B 43/26* (2006.01)
(Continued)

(52) U.S. Cl.
CPC ............ *E21B 49/008* (2013.01); *E21B 43/26* (2013.01); *E21B 47/06* (2013.01); *G06F 17/10* (2013.01)

(58) Field of Classification Search
CPC ....................................................... E21B 43/25
See application file for complete search history.

(56) References Cited

U.S. PATENT DOCUMENTS

| 4,192,182 A * | 3/1980 | Sylvester | E21B 43/17 166/271 |
| 6,668,922 B2 * | 12/2003 | Ziauddin | A61L 2/20 166/250.02 |

(Continued)

OTHER PUBLICATIONS

Halliburtion, Step Rate Testing (2012).*
(Continued)

*Primary Examiner* — Angela M DiTrani Leff
*Assistant Examiner* — Avi T Skaist (57) ABSTRACT

A method for optimized matrix acidizing, including a method for determining fracture pressure of a formation as a function of bottom hole temperature. First and second cycles of a step up rate test may be performed on the formation to be acidized at first and second test temperatures, respectively. From the first and second cycles, a mathematical relationship for fracture pressure of the formation as a function of bottom hole temperature may be formulated and integrated into a fluid placement simulator. A design matrix acidizing treatment plan accounting for an effect of bottom hole temperature on fracture gradient may simulated, and matrix acidizing treatment thereafter performed according to the design plan, thereby resulting in more accurate matrix acidizing treatment and minimization of inefficient fluid placement by adherence to actual formation fracture pressure limits.

10 Claims, 6 Drawing Sheets

(51) Int. Cl.
*E21B 47/06* (2012.01)
*G06F 17/10* (2006.01)

(56) References Cited

U.S. PATENT DOCUMENTS

| | | |
|---|---|---|
| 2004/0211558 A1 | 10/2004 | Morales et al. |
| 2008/0209997 A1 | 9/2008 | Bailey et al. |
| 2009/0194330 A1 | 8/2009 | Gray |
| 2010/0132946 A1 | 6/2010 | Bell et al. |
| 2014/0058686 A1 | 2/2014 | Anderson et al. |
| 2014/0182841 A1 | 7/2014 | Lecerf et al. |

OTHER PUBLICATIONS

International Search Report and Written Opinion, dated Sep. 3, 2015, 9 pages; Korean International Searching Authority.
Canadian Intellectual Property Office, Application No. 2959593, First Office Action, dated Apr. 11, 2018, 4 pages, Canada.
T.K Perkins and J.A. Gonzalez, Changes in Earth Stresses Around a Wellbore Caused by Radially Symmetrical Pressure and Temperature Gradients, Apr. 1984, 12 pages, Society of Petroleum Engineers of AIME, Society of Petroleum Engineers Journal, SPE-10080, SPE Annual Technical Conference and Exhibition, San Antonio, Texas.
Manuel Eduardo Gonzalez, James Benjamin, Bloys, John E. Lofton, Gregory Paul Pepin, Joseph H. Schmidt, Carey John Naquin, Scot Thomas Ellis, Increasing Effective Fracture Gradients by Managing Wellbore Temperatures, Mar. 2-4, 2004, 14 pages, IADC/SPE 87217, IADC/SPE Drilling Conference, Dallas, Texas.
K.M. Abdalkadeer, E. Senturk, S. Dunn-Norman, H.E. Goodman, M. Prada and N. Rivera, changes in Near Wellbore Stress and Fracture Gradient Due to Cold Water Injection in a Sirte Basin Field, Libya, Oct. 19-21, 2009, 17 pages, Society of Petroleum Engineers, SPE 125310, 2009 SPE/EAGE Reservoir Characterization and Simulation Conference, Abu Dhabi.
Mary Van Domelen, Noor Talib and Gerard Glasbergen, Return to Basics and Proper Planning Opens the Possibility to Acid Stimulate a Difficult Chalk Formation, Jun. 7-10, 2011, 19 pages, Society of Petroleum Engineers, SPE 144159SPE European Formation Damage Conference, Noordwijk, The Netherlands.
Bernt S. Aadnoy and Reza Looyeh, Petroleum Rock Mechanics: Drilling Operations and Well Design, 2 pages, Sep. 2010, Elsevier.
Gregory Pepin, Manuel Gonzalez, J. Ben Bloys, John Lofton, Joseph Schmidt, and Carey Naquin, Effect of Drilling Fluid Temperature on Fracture Gradient: Field Measurements and Model Predictions, Jun. 9, 2004, 9 pages, American Rock Mechanics Association, ARMA-04-527, 6th North America Rock Mechanics Symposium (NARMS): Rock Mechanics Across Borders and Disciplines, Houston, Texas.

\* cited by examiner

OPTIMIZING MATRIX ACIDIZING TREATMENT

CROSS REFERENCE TO RELATED APPLICATIONS

The present application is a U.S. National Stage patent application of International Patent Application No. PCT/US2014/070709, filed on 17 Dec. 2014, the benefit of which is claimed and the disclosure of which is incorporated herein by reference in its entirety.

TECHNICAL FIELD

The present disclosure relates generally to operations performed and equipment used in conjunction with a subterranean well, such as a well for recovery of oil, gas, or minerals. More particularly, the disclosure relates to well completion and treatment systems and methods.

BACKGROUND

Completion operations, for both main and lateral wellbores, may include gravel packing, fracturing, acidizing, cementing, and perforating, for example, as well as running and hanging a completion string within the wellbore. Completion strings may include various completion equipment such as perforators, filter assemblies, flow control valves, downhole gauges, hangers, packers, crossover assemblies, completion tools, and the like.

Acidizing involves stimulation by acid under matrix conditions in carbonate formations to create highly conductive flow channels. Such channels may be known as wormholes. Wormholes may be formed when the matrix of the porous and permeable rock is dissolved by corrosive fluids, such as hydrochloric acid. These flow channels promote fluid communication between the wellbore and hydrocarbon-bearing formation, thereby allowing hydrocarbons to flow into the wellbore at a minimum drawdown pressure. Matrix acid treatment should be performed in such a way to form deep penetrating wormholes.

As such, one important treatment parameter that should be considered is injection flow rate. If the injection flow rate is too low, only permeable rock in the vicinity of the wellbore may dissolved. Therefore, matrix acidizing at higher rates may be preferred, as it may lead to better fluid coverage in the reservoir layers and more efficient wormhole production.

However, injection rates may be limited by treatment pressure constraints. Bottom hole treatment pressure should not exceed the fracture pressure for the formation, because fracturing during matrix acidizing may cause an unfavorable fluid distribution. In order to estimate the formation fracture pressure, a step up rate test may first be conducted.

BRIEF DESCRIPTION OF THE DRAWINGS

Embodiments are described in detail hereinafter with reference to the accompanying figures, in which.

DETAILED DESCRIPTION

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

In a typical process for completing a wellbore, one or more upper portions of the wellbore may first be drilled and, a casing may be installed. After casing installation, a lower portion of the wellbore may be drilled. Completion operations may then be performed, which may include gravel packing, fracturing, acidizing, cementing, and perforating, for example. The completion string may include various completion equipment such as perforators, filter assemblies, flow control valves, downhole permanent gauges, hangers, packers, crossover assemblies, completion tools, and the like.

Figure 1:
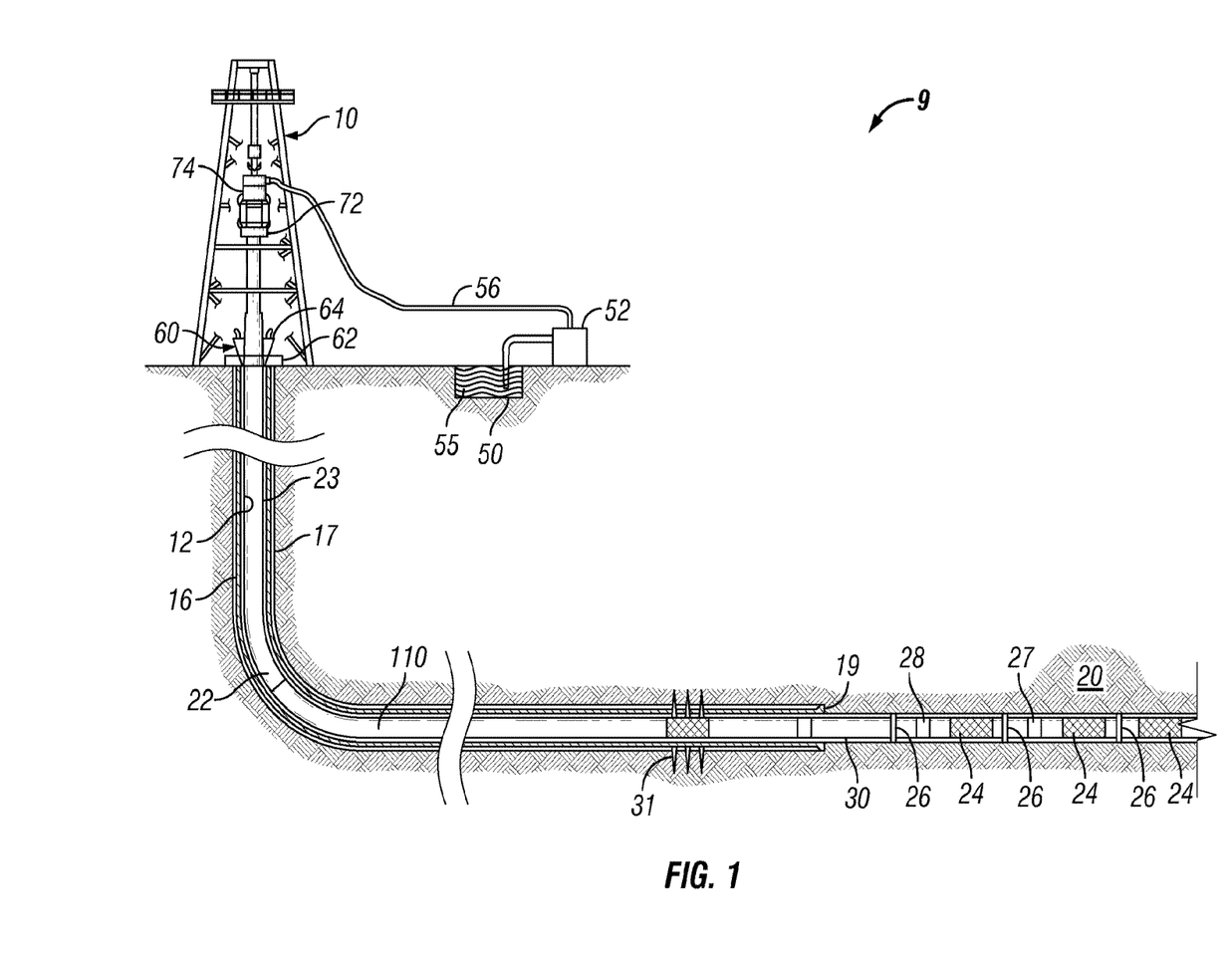
FIG. 1 is an elevation view in partial cross section of a portion of a well system according to an embodiment, showing a completion string located within a wellbore.

With the forgoing in mind, FIG. 1 is an elevation view in partial cross-section of a well system, generally designated 9, according to an embodiment. Well system 9 may include drilling, completion, servicing, or workover rig 10. Rig 10 may be deployed on land or used in association with offshore platforms, semi-submersibles, drill ships and any other system satisfactory for completing a wellbore.

Rig 10 may include a suspension member 60, such as a rotary table 62 having a slip bowl formed therein and a set of slips 64. Rig 10 may also include an elevator 72, swivel 74, and/or top drive (not illustrated). A blow out preventer, christmas tree, and/or and other equipment associated with servicing or completing a wellbore (not illustrated) may also be provided.

In the illustrated embodiment, a wellbore 12 extends through various earth strata into a hydrocarbon bearing subterranean formation 20. As illustrated, a portion of wellbore 12 may be lined with a casing string 16, which may be joined to the formation with casing cement 17. A portion of wellbore 12 may also be open hole, i.e., uncased. Casing 16 may terminate at its distal end with a casing shoe 19.

A tubing string 22, extending from the surface, may be positioned within wellbore 12. An annulus 23 is formed between the exterior of tubing string 22 and the inside wall of wellbore 12 or casing string 16. Tubing string 22 may define a hollow interior 110 to provide a sufficiently large internal flow path for formation fluids to travel from formation 20 to the surface (or vice versa in the case of an injection well), and it may provide for workover operations and the like as appropriate. Interior 110 may be fluidly coupled via swivel 74 and a conduit 56 to a pump 52. A reservoir 50 may supply treatment fluid 55 to pump 52 for dispensing treatment fluid into wellbore 12 via tubing string 22.

Tubing string 22 may carry a completion string 30, which may equally be used in open hole environments or in cased wellbores. In the latter case, casing 16, casing cement 17, and the surrounding formation may be perforated, such as by a perforating gun, creating openings 31 for flow of fluid from formation 20 into wellbore 12.

Completion string 30 may include one or more filter assemblies 24, each of which may be isolated within the wellbore by one or more packers 26 that provide a fluid seal between the completion string and wellbore wall. Filter assemblies 24 may filter sand, fines and other particulate matter out of the production fluid stream. Filter assemblies 24 may also be useful in controlling the flow rate of the production fluid stream. Completion string 30 may also include flow control valves 27, downhole gauges 28, completion tools, and the like.

Figure 2:
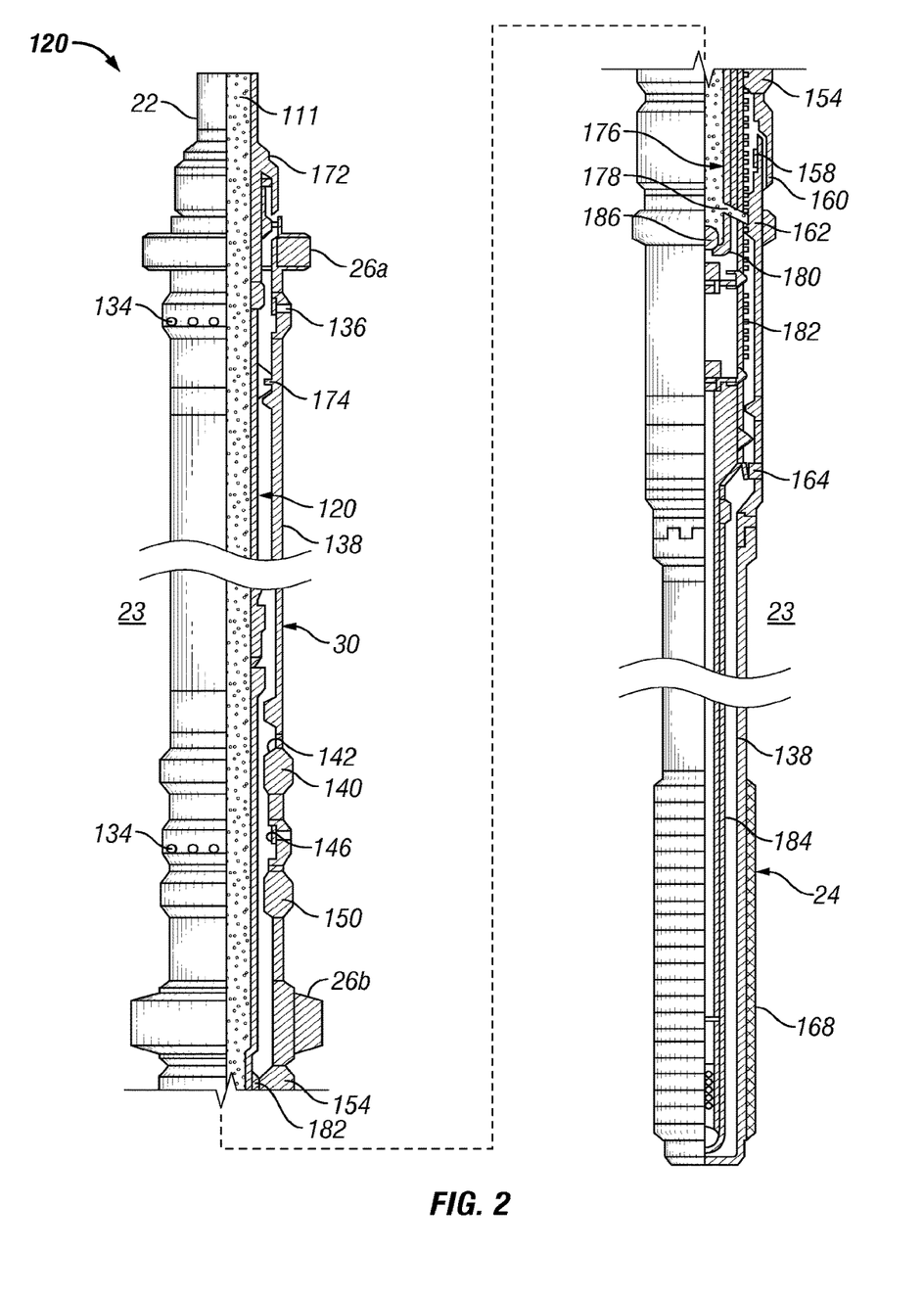
FIG. 2 is a longitudinal cross section of one embodiment of a completion tool assembly according to an embodiment.

FIG. 2 is a longitudinal cross section of completion tool assembly 120, which may be carried by completion string 30 for matrix acidizing and other completion operations. Completion tool assembly 120 may also be a combined cementing and gravel packing tool assembly, which may provide selective flow paths for gravel packing, cementing, cleaning and, if desired, inflating packers. However, any suitable completion tool assembly for performing a step up test and for matrix acidizing may be used as appropriate.

Completion string 30 may include one or more filter assemblies 24 and packers 26, interconnected with sections of blank pipe 138. Completion string 30 may also include various ports, valves and bore seals, which may selectively interact with completion tool assembly 120, as described below.

For example, a first packer 26a may be provided, which may be a combination packer/hanger to resist axial movement of completion string 30 in wellbore 12. Packer 26a may provide a fluid-tight seal between completion string 30 and either a cased or uncased wall of wellbore 12.

An upper port 134 may be located downhole of first packer 26a. Upper port 134 may include a sleeve valve 136 that allows upper port 134 to be selectively opened or shut. In the run-in position, the valve 136 is preferably shut.

Below upper port 134, blank pipe 138 may be included along completion string 30. Blank pipe 138 may be a conventional oil field tubular element, such as steel pipe. The length of blank pipe 138 may be selected based on the location of producing formation 20 (FIG. 1) and/or the desired location of filter assembly 24. Blank pipe 138 may pass through curved or deviated portions of wellbore 12 and may be of considerable length.

A first seal bore 140 having an inner sealing surface 142 may be located downhole of blank pipe 138. Seal bore 140 may include a thick wall coupling or length of pipe having a polished inner seal bore surface 142 having a precise inner diameter less than the minimum inner diameter of blank pipe 138. Alternatively, seal bore 140 may be a coupling or length of pipe having an inner sealing surface 142 formed of an elastomeric material, such as one or more O-rings. As described in more detail below, completion tool assembly 120 may carry a seal body 182 to seal against sealing surface 142. If the sealing surface 142 is a polished metal surface, completion tool assembly 120 may carry a matching elastomeric seal body 182. If the sealing surface 142 includes an elastomeric element, then, completion tool assembly 120 may carry a matching polished metal seal body 182.

A lower port 144, including a sleeve valve 146, may be located downhole of seal bore 140. Sleeve valve 146 may allow lower port 144 to be selectively opened or shut. In the run-in position, sleeve valve 146 is preferably shut. The lower port 144 may also include a spring-biased one-way check valve that allows fluid flow out of port 144 into annulus 23, but prevents flow from annulus 23 into port 144. Other forms of one-way valves may be used if desired. A second seal bore 150, which may be substantially similar to first seal bore 140 described above, may be located downhole of lower port 144.

A second packer 26b may be located below second seal bore 150. A third seal bore 154 may be located below second packer 26b. A pressurizing port 156 may be located downhole of third seal bore 154. Pressurizing port 156 may include a sleeve valve 158, that allows pressurizing port 156 to be selectively opened or shut. In the run-in position, valve 158 is preferably shut. Pressurizing port 156 may include an outer shroud 160, which may direct fluids flowing out of pressurizing port 156 downwardly to avoid erosion of the wall of borehole 15. A fourth seal bore 162 may be positioned below pressurizing port 156. A flapper valve 164 may be located below fourth seal bore 162. While a flapper valve 164 is shown, other fluid loss control devices, for example a ball valve, may also be used as appropriate.

Filter assembly 24 may be located below flapper valve 164 and in an embodiment, as shown in FIG. 2, may serve to terminate the distal end of completion string 30. Filter assembly 24 may include a screen 168. Other forms of filters, such as slotted pipe or perforated pipe, may be used in place of screen 168 if desired. Blank pipe 138 may connect filter assembly 24 as part of completion string 30.

Completion tool assembly 120 may be connected at its upper end to tubing string 22. Completion tool assembly 120 may include a packer setting tool 172 near its upper end. Packer setting tool 172 may be used to set packer 26a.

Completion tool assembly 120 may include a shifter 174 for opening and closing various sleeve valves 136, 146 and 158 as completion tool assembly 120 is moved down and up within completion string 30. Completion tool assembly 120 may also include a crossover assembly, shown generally at 176. Crossover assembly 176 may include a crossover port 178 that may be in fluid communication with the interior 111 of tubing string 22 and a crossover channel 180 that may be in fluid communication with annulus 23.

As mentioned above, seal body 182 may be provided. Seal body 182 may be carried on the cylindrical outer surface of crossover assembly 176 and may extend above and below crossover port 178. Seal body 182 may be formed as a separate metal sleeve having a plurality of elastomeric rings on its outer surface. The outer diameter of the elastomeric rings may be slightly greater, e.g. 0.010 to 0.025 inch greater, than the inner diameter of seal bores 140, 150, 154 and 162. In such an arrangement, seal bores 140, 150, 154 and 162 may have polished metal inner surfaces, e.g. 142.

Alternatively, the inner surfaces of seal bores 140, 150, 154 and 162 may include elastomeric elements such as O-rings, and seal body 182 may be only a metal sleeve having a polished outer surface with an outer diameter somewhat larger than the inner diameter of the elastomeric elements of seal bores 140, 150, 154 and 162.

In either case, seal body 182 may form fluid-tight seals with seal bores 140, 150, 154 and 162 at any point along the length of the seal body 182. Seal body 182 may have sufficient length above and below crossover port 178 to form seals with seal bores 140 and 150 at the same time or with seal bores 154 and 162 at the same time.

The lowermost portion of the completion tool assembly 120 may include a wash pipe 184, which may extend through flapper valve 164 and into filter assembly 24.

In operation, from the run-in configuration shown in FIG. 2, first packer 26a may first be set using packer setting tool 172, introducing a drop ball 186 through interior 111 of tubing string 22, and increasing then pressure within interior 111. Crossover port 178 may be located at the lowermost seal bore 162 below pressurizing port 156. Seal body 182 may contact seal bore 162 both above and below crossover port w78, thereby preventing flow into or out of crossover port 178. Drop ball 186 may isolate interior 111 of working string 110 from annulus 23, both above and below upper packer 26a. Increasing pressure in annulus 23 uphole of set first packer 26a may function to set second packer 26b.

After both packers 26a, 26b have been set, completion tool assembly 120 may be repositioned for matrix acidizing. By lifting tubing string 22, crossover port 178 may be positioned in fluid communication with pressurizing port 156 by positioning seal body 182 to contact seal bores 154 and 162 above and below crossover port 178 respectively. An acid mixture may then be pumped down tubing string 22 and through crossover port 178 and pressurizing port 156 into annulus 23. By preventing return flow through annulus 23, high pressure may be applied to force the treatment fluids into formation 21.

Tubing string 22 may be positioned to move crossover port 178 uphole of seal bore 154 while leaving seal body 182 in sealing contact with seal bore 154 below port 178. In this position, fluid may be reverse circulated down annulus 23, into crossover port 178, and up interior 111 of tubing string 22 to remove any remaining acid or treatment fluid from annulus 23 and tubing string 22.

Figure 3:
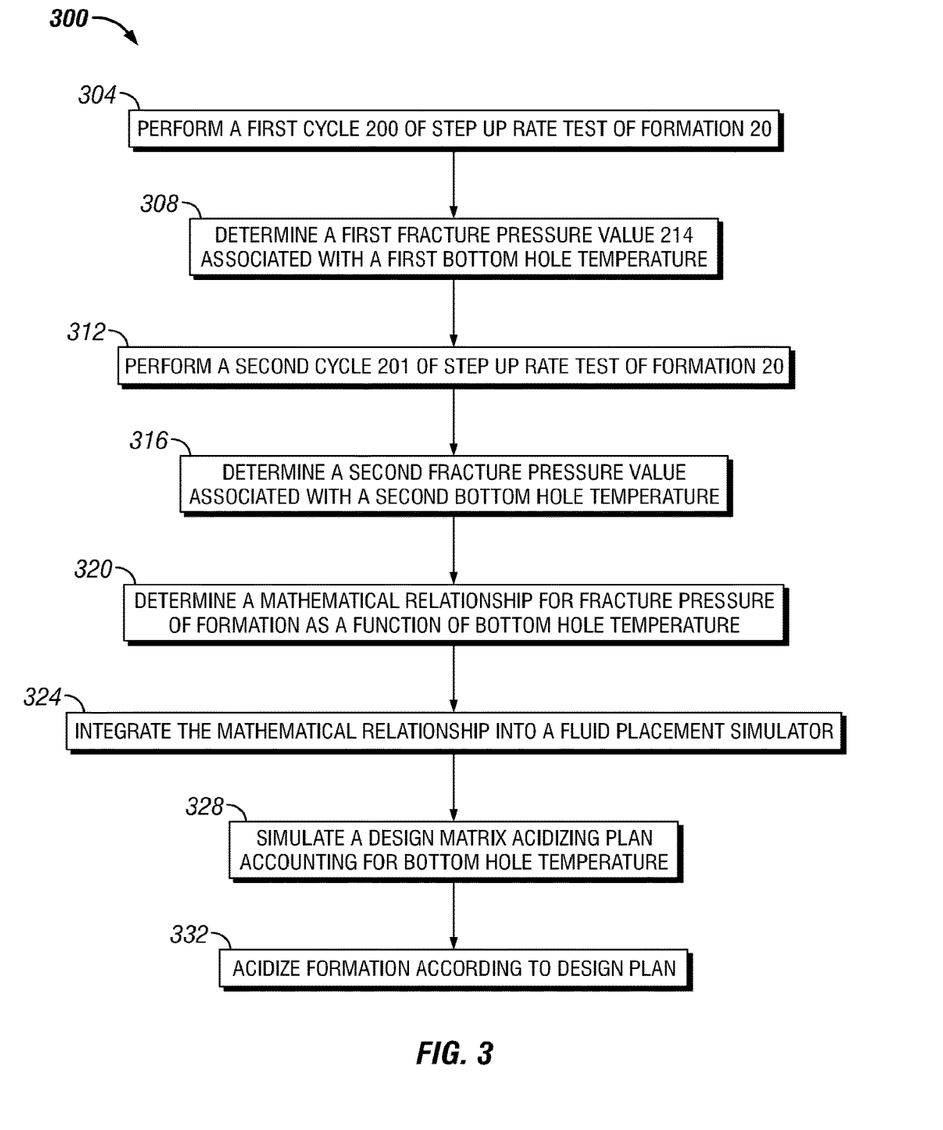
FIG. 3 is a flow chart of a method for matrix acidizing according to an embodiment.

FIG. 3 is a flow chart outlining a process 300 for matrix acidizing according to one or more embodiments, which include a method for estimating formation fracture pressure as a function of bottom hole temperature.

Figure 4:
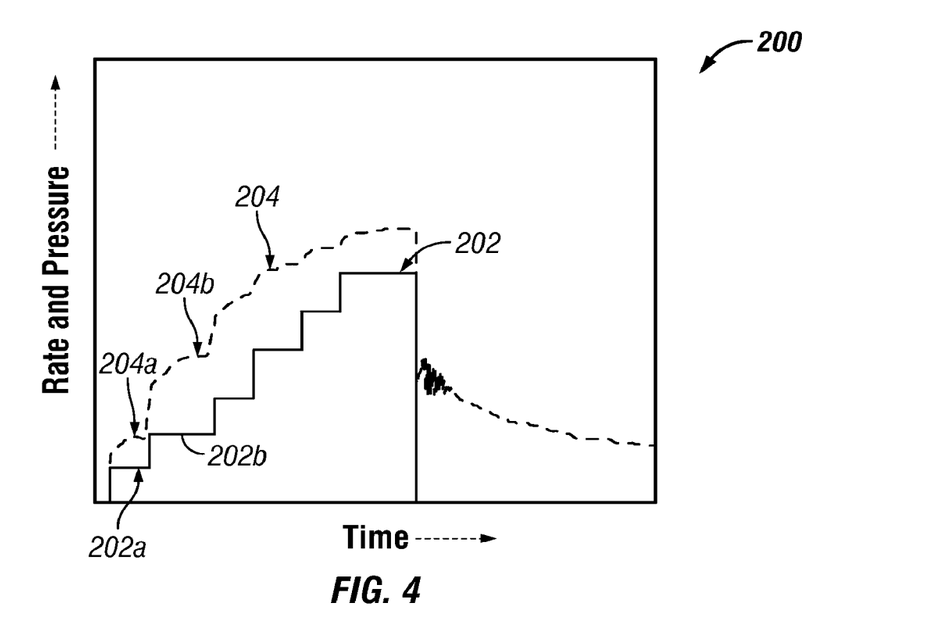
FIG. 4 is combined graph showing pump flow rate and bottom hole pressure measured over time during a first cycle of a step up rate test according to an embodiment.

FIG. 4 is combined graph showing pump flow rate 202 and bottom hole pressure 204 measured over time. Referring to FIGS. 1, 3, and 4, matrix acidizing process 300 may inclu at step 304, where a first cycle 200 of a step up rate test of formation 20 may be performed at a first test temperature. The first cycle 200 of the step up rate test may be performed by injecting fluid 55 with pump 52 at a number of varying steady state flow rates into wellbore 12. The test temperature may be measured and recorded and may be defined by the surface injection temperature of fluid 55.

Initially, fluid 55 is injected at a low flow rate 202a. Bottom hole pressure 204 is monitored and allowed to stabilize. The stabilized bottom hole pressure 204a at flow rate 202a is recorded. The injection rate is then increased in steps 202b . . . 202i, and at each rate a stabilized value 204b . . . 204i of bottom hole pressure is measured.

Figure 5:
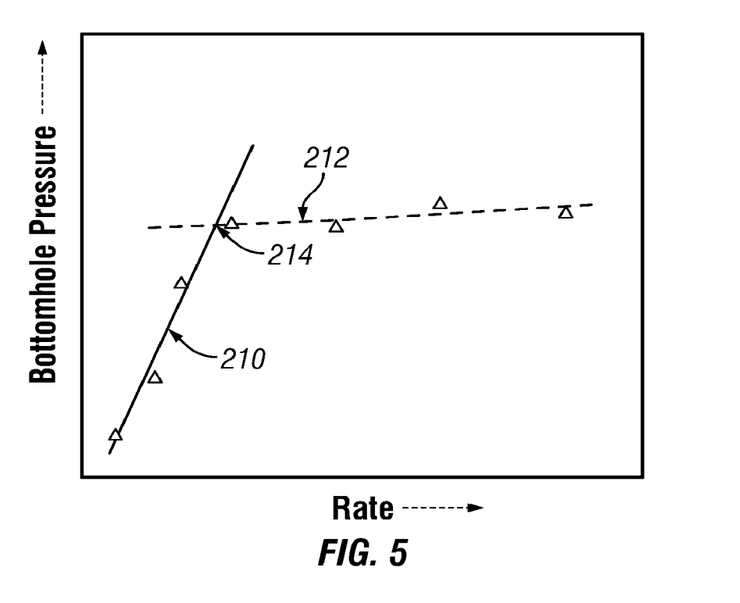
FIG. 5 is a plot of measured stabilized bottom hole pressure values versus corresponding injection rates as determined during a first cycle of a step up rate test according to an embodiment.

FIG. 5 is a plot of measured stabilized bottom hole pressure values 204a, 204b, . . . 204i versus the corresponding injection rates 202a, 202b, . . . 202i as determined in step 304. Referring to FIGS. 3 and 5, at step 308, a first fracture pressure value 214 may be determined. It may be seen that initially, bottom hole pressure 204 increases substantially in a linear manner with injection flow rate 202. This relation is indicated by matrix line 210 having a large slope. Thereafter, as injection rate 202 is further increased, bottom hole pressure 204 only increases slightly, as indicated by fracturing line 212. The intersection of matrix line 210 and fracturing line 212 defines a first fracture pressure value 214 at the first test temperature.

Figure 6:
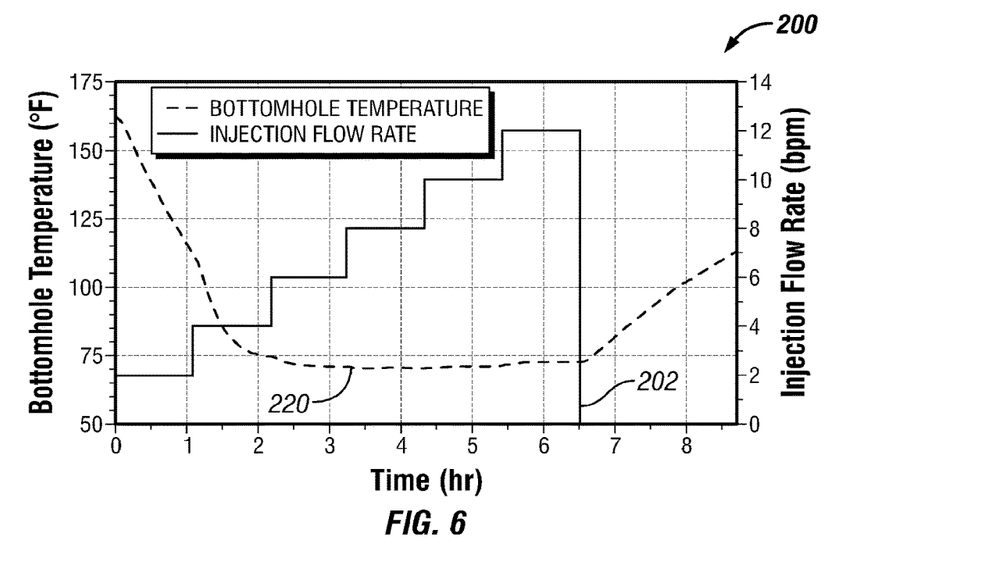
FIG. 6 is a graph of bottom hole temperature and injection flow rate over time for a first cycle of a step up rate test according to an embodiment.

FIG. 6 is a graph of bottom hole temperature 220 and injection flow rate 202 over time for the first cycle 200 of the step up rate test. Referring to FIGS. 3 and 6, continuing with step 308, the first test temperature, which may be the surface injection temperature, may be used with injection rate 202 data to determine bottom hole temperature 220, thereby correlating first fracture pressure value 214 to a bottom hole temperature 220 of formation 20 (FIG. 1). In an embodiment, computer simulation of heat transfer may be used to estimate bottom hole temperature. In the example of FIG. 6, surface injection temperature 60° F. As flow occurs within wellbore 12 during first cycle 200 of the step up rate test, an initial bottom hole temperature of approximately 160° F. rapidly cools to a steady state value of about 70° F. Alternatively or additionally, instrumentation within wellbore 12 may be used to provide measurements of bottom hole temperature 220 directly during step up rate testing.

Referring back to FIG. 3, at steps 312 and 316, a second cycle 201 of the step up rate test may be conducted on formation 20 at a second test temperature, which may be intentionally different from the first test temperature. As before, the test temperature may be measured and recorded and may be defined by the surface injection temperature of fluid 55 (FIG. 1). In an embodiment, the injection rates and times are set to be the same as the injection rates and times of the first cycle 200, thereby allowing the effects of temperature on fracture pressure to be determined. Second cycle 201 may be performed in a similar manner as first cycle 200 (steps 304, 308) to determine a second fracture pressure value 215 at the second test temperature.

Figure 7:
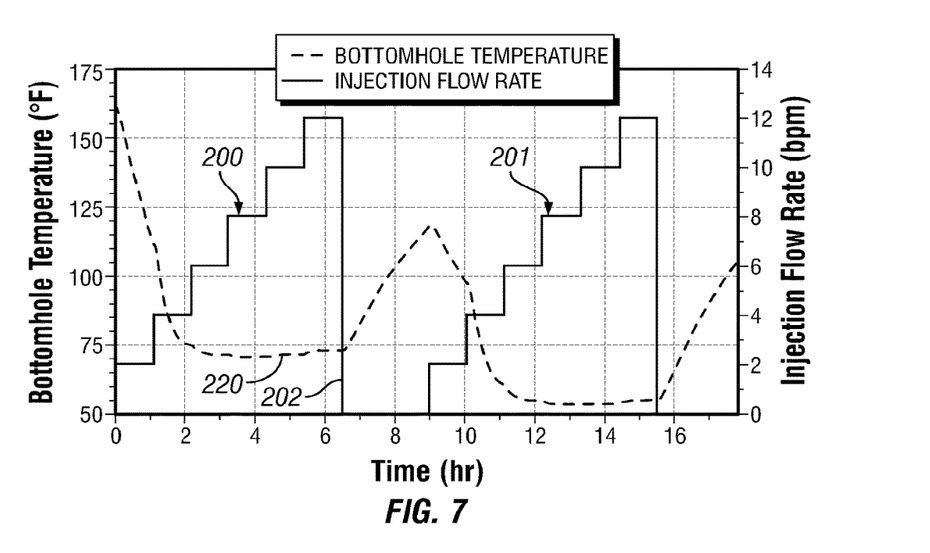
FIG. 7 is a graph of bottom hole temperature and injection flow rate over time for first and second cycles of a step up rate test according to an embodiment.

FIG. 7 is a graph of bottom hole temperature 220 and injection flow rate 202 over time for both the first and second cycles 200, 201 of the step up rate test. Referring to FIGS. 3 and 6, continuing with step 316, the second test temperature, which may be the surface injection temperature, may be used with injection rate 202 data to determine bottom hole temperature 220 during both cycles. In an embodiment, computer simulation of heat transfer may be used to determine bottom hole temperature. In the example of FIG. 6, surface injection temperature 60° F. is used for the first cycle 200, and a surface injection temperature of 40° F. is used for the second cycle 201. Bottom hole temperature 220 during the first cycle is shown to cool to a steady state value of about 70° F., whereas bottom hole temperature 220 during second cycle 201 is shown to cool to about 55° F. Alternatively or additionally, instrumentation within wellbore 12 may be used to provide measurements of bottom hole temperature 220 directly during step up rate testing.

Referring back to FIG. 3, at step 320, a mathematical relationship for fracture pressure of formation 20 as a function of bottom hole temperature may be determined from the first and second fracture pressure values at first and second bottom hole temperatures, respectively, determined during first and second cycles 200, 201 of step up rate testing. The mathematical relationship may be determined by interpolation, extrapolation, curve fitting, etc.

Prior to performing acidizing treatment of a formation, a design matrix acidizing plan may be created, which outlines injection flow rates, surface treating pressure, bottom hole treatment pressure, and treatment duration. Such a design matrix acidizing plan may be created using a computerized fluid placement simulator. According to an embodiment, at step 324, the fracture pressure-bottom hole temperature mathematical relationship determined in step 320 may be integrated into a fluid placement simulator to account for a fracture pressure gradient based on bottom hole temperature during matrix acidizing treatment.

Figure 8:
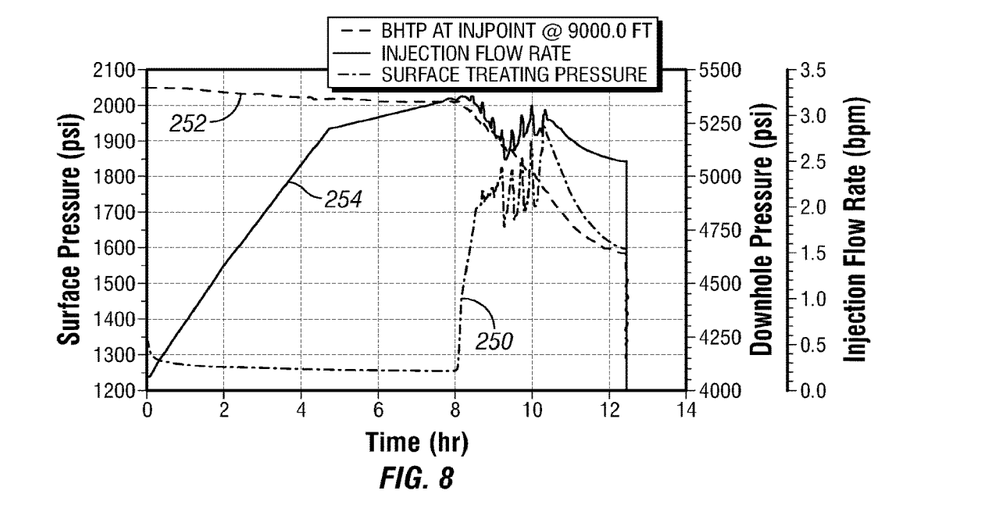
FIG. 8 is a graph of a design matrix acidizing plan that accounts for a fracture pressure gradient based on bottom hole temperature according to an embodiment, showing planned injection flow rate, bottom hole treatment pressure at the injection point, and corresponding surface treatment pressure over time.
Figure 9:
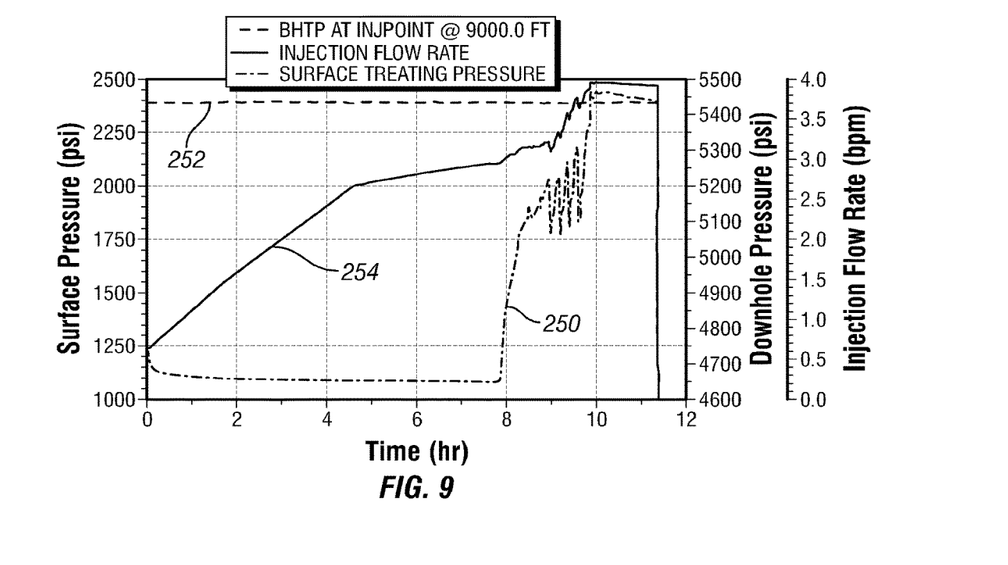
FIG. 9 is a graph of a design matrix acidizing plan that ignores bottom hole temperature, showing planned injection flow rate, bottom hole treatment pressure at the injection point, and corresponding surface treatment pressure over time.

Thus, at step 328, a design matrix acidizing plan that accounts for bottom hole temperature may be simulated for formation 20. FIG. 8 illustrates such a design matrix acidizing plan, with an initial fracture gradient of 0.75 psi/ft. and an initial bottom hole temperature of 200° F. For comparison purposes, FIG. 9 illustrates a design matrix plan that does not account for a fracture pressure gradient based on bottom hole temperature. On each of FIGS. 8 and 9, planned injection flow rate 250, bottom hole treatment pressure 252 at the injection point, and corresponding surface treatment pressure 254 are indicated.

In order to prevent formation fracture, acidizing treatment should be performed while keeping bottom hole treatment pressure 252 below the formation fracture pressure. However, the bottom hole conditions during the previously-conducted step up rate tests and the actual acidizing treatment may not be identical. It is possible that formation cooling during matrix acidizing treatment, which may increase thermal stresses within the formation, may lead to lowering of the formation fracture pressure.

If such a condition occurs, and the design matrix plan that does not account for a fracture pressure gradient based on bottom hole temperature (as shown in FIG. 9), the design matrix acidizing plan may not represent actual formation constraints. Bottom hole treatment pressure may therefore exceed the fracture pressure.

Moreover, a comparison of FIGS. 8 and 9 shows that a fluid placement simulator that ignores effects of bottom hole temperature (FIG. 9) predicts a higher injection flow rate 250 than does a fluid placement simulator that accounts for effects of bottom hole temperature 250 (FIG. 8). For this reason, the fluid placement simulator of FIG. 9 underestimates the time required time required for matrix acidizing by approximate one hour and concomitantly, the acid volume requirements.

Referring back to FIG. 3, for the above reasons, step 328 (FIG. 3), simulating a design matrix acidizing plan that accounts for bottom hole temperature for formation 20 (FIG. 1), may result in a more accurate matrix acidizing treatment plan and minimization of inefficient fluid placement due to treatment within fracture pressure limits. At step 332, matrix acidizing treatment of the formation according to the design matrix acidizing treatment plan of step 328 may be performed, using completion tool assembly 120 (FIG. 2) or like tool.

In summary, a method for determining fracture pressure of a formation and a method for matrix acidizing have been described. Embodiments of a method for determining fracture pressure of a formation may generally include: Performing a first cycle of a step up rate test of the formation at a first test temperature; determining a first fracture pressure value associated with a first bottom hole temperature; performing a second cycle of the step up rate test of the formation at a second test temperature; determining a second fracture pressure value associated with a second bottom hole temperature; and from the first and second fracture pressure values, formulating a mathematical relationship for fracture pressure of the formation as a function of bottom hole temperature. Embodiments of a method for matrix acidizing may generally include: Performing first and second cycles of a step up rate test on a formation to be acidized at first and second test temperatures, respectively; determining a mathematical relationship for fracture pressure of the formation as a function of bottom hole temperature; integrating the mathematical relationship into a fluid placement simulator; simulating by the fluid placement simulator a design matrix acidizing treatment plan for the formation accounting for an effect of bottom hole temperature on fracture gradient; and performing matrix acidizing treatment of the formation according to the design matrix acidizing treatment plan.

Any of the foregoing embodiments may include any one of the following elements or characteristics, alone or in combination with each other: The first and second test temperatures are first and second surface injection temperatures, respectively; injecting fluid into the formation at a first flow rate from a first point in time until a second point in time during the first cycle, the first and second points of time defining a first duration; allowing a bottom hole pressure in the formation to stabilize during the first and second points of time; measuring a first stabilized bottom hole pressure during the first and second points of time; injecting fluid into the formation at a second flow rate from a third point in time until a fourth point in time during the first cycle, the third and fourth points of time defining a second duration; allowing a bottom hole pressure in the formation to stabilize during the third and fourth points of time; measuring a second stabilized bottom hole pressure during the third and fourth points of time; injecting fluid into the formation at the first flow rate from a fifth point in time until a sixth point in time during the second cycle, the fifth and sixth points of time defining the first duration; allowing a bottom hole pressure in the formation to stabilize during the fifth and sixth points of time; measuring a third stabilized bottom hole pressure during the fifth and sixth points of time; injecting fluid into the formation at the second flow rate from a seventh point in time until an eighth point in time during the second cycle, the seventh and eighth points of time defining the second duration; allowing a bottom hole pressure in the formation to stabilize during the seventh and eighth points of time; measuring a fourth stabilized bottom hole pressure during the seventh and eighth points of time; performing the first and second cycles of the step up rate test includes injecting fluid into the formation at a plurality of steady state flow rates for a plurality of respective durations an for each of the plurality of durations, measuring a steady state bottom hole pressure and temperature; determining first and second fracture pressure values using the plurality of steady state flow rates and the plurality of steady state bottom hole pressure measurements; and determining the mathematical relationship using the first and second fracture pressure values and the plurality of steady state bottom hole temperature measurements.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed:

1. A method tier matrix acidizing, comprising:
performing first and second cycles of a step up rate test on a formation to be acidized at first and second test temperatures, respectively, wherein the second test temperature is different from the first test temperature;
determining, from the first cycle of the step up rate test, a first fracture pressure value for the formation associated with the first test temperature;
determining, from the second cycle of the step up rate test, a second fracture pressure value for the formation associated with the second test temperature;
determining, from the first and second fracture pressure values, a mathematical relationship for fracture pressure of the formation as a function of bottom hole temperature;
integrating the mathematical relationship into a fluid placement simulator;
simulating by the fluid placement simulator a design matrix acidizing treatment plan for the formation accounting for an effect of bottom hole temperature on fracture gradient; and
performing matrix acidizing treatment of the formation according to the design matrix acidizing treatment plan.

2. The method of claim 1 wherein:
the first and second test temperatures are first and second surface injection temperatures, respectively, wherein the bottom hole temperature is determined from the surface injection temperatures.

3. The method of claim 1 further comprising:
injecting fluid into the formation at a first flow rate from a first point in time until a second point in time during the first cycle, the first and second points of time defining a first duration;
allowing a bottom hole pressure in the formation to stabilize during the first and second points of time; and
measuring a first stabilized bottom hole pressure during the first and second points of time.

4. The method of claim 3 further comprising:
injecting fluid into the formation at a second flow rate from a third point in time until a fourth point in time during the first cycle, the third and fourth points of time defining a second duration;
allowing a bottom hole pressure in the formation to stabilize during the third and fourth points of time; and
measuring a second stabilized bottom hole pressure during the third and fourth points of time.

5. The method of claim 4 further comprising:
injecting fluid into the formation at the first flow rate from a filth point in time until a sixth point in time during the second cycle, the fifth and sixth points of time defining the first duration;
allowing a bottom hole pressure in the formation to stabilize during the fifth and sixth points of time;
measuring a third stabilized bottom hole pressure during the fifth and sixth points of time;
injecting fluid into the formation at the second flow rate from a seventh point in time until an eighth point in time during the second cycle, the seventh and eighth points of time defining the second duration;
allowing a bottom hole pressure in the formation to stabilize during the seventh and eighth points of time; and
measuring a fourth stabilized bottom hole pressure during the seventh and eighth points of time.

6. The method of claim 1 wherein:
performing the first and second cycles of the step up rate test includes injecting fluid into the formation at a plurality of steady state flow rates for a plurality of respective durations and for each of the plurality of durations, measuring a steady state bottom hole pressure and temperature.

7. The method of claim 6 further comprising:
determining the first and second fracture pressure values using the plurality or steady state flow rates and the plurality of steady state bottom hole pressure measurements, wherein the first and second fracture pressure values are determined from a change in a relation between the steady state bottom hole pressure measurements and the steady state flow rates.

8. The method of claim 7 further comprising:
determining the mathematical relationship using the first and second fracture pressure values and the plurality of steady state bottom hole temperature measurements.

9. The method of claim 1, wherein the mathematical relationship is determined by interpolation of the first and second fracture pressure values.

10. The method of claim 1, wherein the matrix acidizing plan employs an initial fracture gradient based on an initial bottom hole temperature at a first point in time in the matrix acidizing plan, and at least a subsequent fracture gradient based on a second bottom hole temperature at a second time in the matrix acidizing plan, wherein the subsequent fracture gradient is different than the initial fracture gradient.

* * * * *

UNITED STATES PATENT AND TRADEMARK OFFICE
CERTIFICATE OF CORRECTION

PATENT NO. : 10,329,907 B2
APPLICATION NO. : 14/781888
DATED : June 25, 2019
INVENTOR(S) : Ankit Bhatnagar and Mohammed Monsur Alam It is certified that error appears in the above-identified patent and that said Letters Patent is hereby corrected as shown below:

In the Claims

In Claim 1, Column 9, Line 2: "tier" should be --for--;

In Claim 5, Column 10, Line 3: "filth" should be --fifth--;

In Claim 7, Column 10, Line 28: "or" should be --of--.

Signed and Sealed this
Eighth Day of October, 2019

Andrei Iancu
*Director of the United States Patent and Trademark Office*